US012636762B2

(12) United States Patent
Phillips et al.

(10) Patent No.: US 12,636,762 B2
(45) Date of Patent: May 26, 2026

(54) TOOL FOR LIFTING AND DISCONNECTING A GPU AND/OR A GPU BRIDGE

(71) Applicant: Lenovo Enterprise Solutions (Singapore) Pte Ltd., Singapore (SG)

(72) Inventors: Reginald Phillips, Knightdale, NC (US); Bejoy J Kochuparambil, Apex, NC (US); Mingtze Chen, Taipei (TW)

( * ) Notice: Subject to any disclaimer, the term of this patent is extended or adjusted under 35 U.S.C. 154(b) by 856 days.

(21) Appl. No.: 17/992,621

(22) Filed: Nov. 22, 2022

(65) Prior Publication Data

US 2024/0165778 A1 May 23, 2024

(51) Int. Cl.
*B25B 27/14* (2006.01)

(52) U.S. Cl.
CPC .................................... *B25B 27/14* (2013.01)

(58) Field of Classification Search
None
See application file for complete search history.

(56) References Cited

U.S. PATENT DOCUMENTS 3,139,045 A * 6/1964 Rojakovick .......... A47B 43/003 108/147.11
3,811,575 A * 5/1974 Boegehold ................ A47F 5/10 248/245
7,152,535 B2 * 12/2006 Mikich ................ A47B 43/003 211/113
10,184,204 B1 * 1/2019 Wood ........................ F26B 3/04
10,973,139 B1 * 4/2021 Tsorng ................. H05K 7/1424
11,849,846 B1 * 12/2023 Hewatt ................ A47B 97/001
2014/0270910 A1 * 9/2014 Sculler ..................... H04N 5/64 403/109.1
2020/0246948 A1 * 8/2020 Jones ...................... B25B 27/14

* cited by examiner

*Primary Examiner* — Steven M Marsh
(74) *Attorney, Agent, or Firm* — Jeffrey L. Streets

(57) ABSTRACT

An apparatus includes a tool body including first and second overlapping body members that are joined together by a first linear slide establishing a first coordinate axis, wherein the first body member has a first planar region that is perpendicular to the first coordinate axis and faces away from the second body member, and wherein the second body member has a second planar region that is perpendicular to the first coordinate axis and faces away from the first body member. The apparatus further includes a latch secured to the first body member and selectively engageable with the second body member to prevent relative movement of the body members along the first coordinate axis. The apparatus also includes planar elongate arms having a distal end forming a hook, the elongate arms being selectively securable to the planar regions at a plurality of positions along a length of the elongate arms.

20 Claims, 14 Drawing Sheets

TOOL FOR LIFTING AND DISCONNECTING A GPU AND/OR A GPU BRIDGE

BACKGROUND

The present disclosure relates to a tool for removing a graphics processing unit (GPU) and/or a GPU bridge from an installed position.

BACKGROUND OF THE RELATED ART

A graphics processing unit (GPU) is a specialized processor capable of accelerating graphics rendering. Graphics processing units are useful for machine learning, video editing and gaming applications. Although a graphics processing unit may be integrated into a computer's central processing unit (CPU), the power and utility of graphics processing units makes them a popular type of expansion card to be added to a computer. In fact, several graphics processing unit expansion cards may be installed side-by-side into a densely populated computer. A bridge, such as a Scalable Link Interface (SLI) or NVLink high speed GPU interconnect, may be used to form a direct connection between adjacent graphics processing units that is faster than using a standard Peripheral Component Interconnect Express (PCIe) solution. However, graphics processing cards and GPU bridges in a densely populated computer system may be difficult to grab and remove without causing damage to the GPU, the GPU bridge or adjacent devices.

BRIEF SUMMARY

Some embodiments provide an apparatus comprising a tool body including first and second overlapping body members, wherein the first and second body members are joined together by a first linear slide establishing a first coordinate axis, wherein the first body member has a first planar region that is perpendicular to the first coordinate axis and faces away from the second body member, and wherein the second body member has a second planar region that is perpendicular to the first coordinate axis and faces away from the first body member. The apparatus further comprises a latch secured to the first body member and selectively engageable with the second body member to prevent relative movement of the first and second body members along the first coordinate axis. Still further, the apparatus comprises first and second elongate arms that are planar and have a distal end forming a hook, wherein the first and second elongate arms are selectively securable to the first and second planar regions at a plurality of positions along a lengthwise axis of the first and second elongate arms, and wherein the hook formed on the distal end of the first elongate arm is directed inwardly toward the hook formed on the distal end of the second elongate arm.

Some embodiments provide a kit comprising the previously described apparatus having first and second elongate arms, and further comprising third and fourth elongate arms each having a distal end that forms a hook, wherein the third and fourth elongate arms are interchangeable with the first and second elongate arms and selectively securable to the first and second planar regions, wherein the hook formed on the distal end of the third elongate arm is directed inwardly toward the hook formed on the distal end of the fourth elongate arm, and wherein the hooks formed on the third and fourth elongate arms have a different size and/or shape than the hooks formed on the first and second elongate arms.

DETAILED DESCRIPTION

Figure 1A:
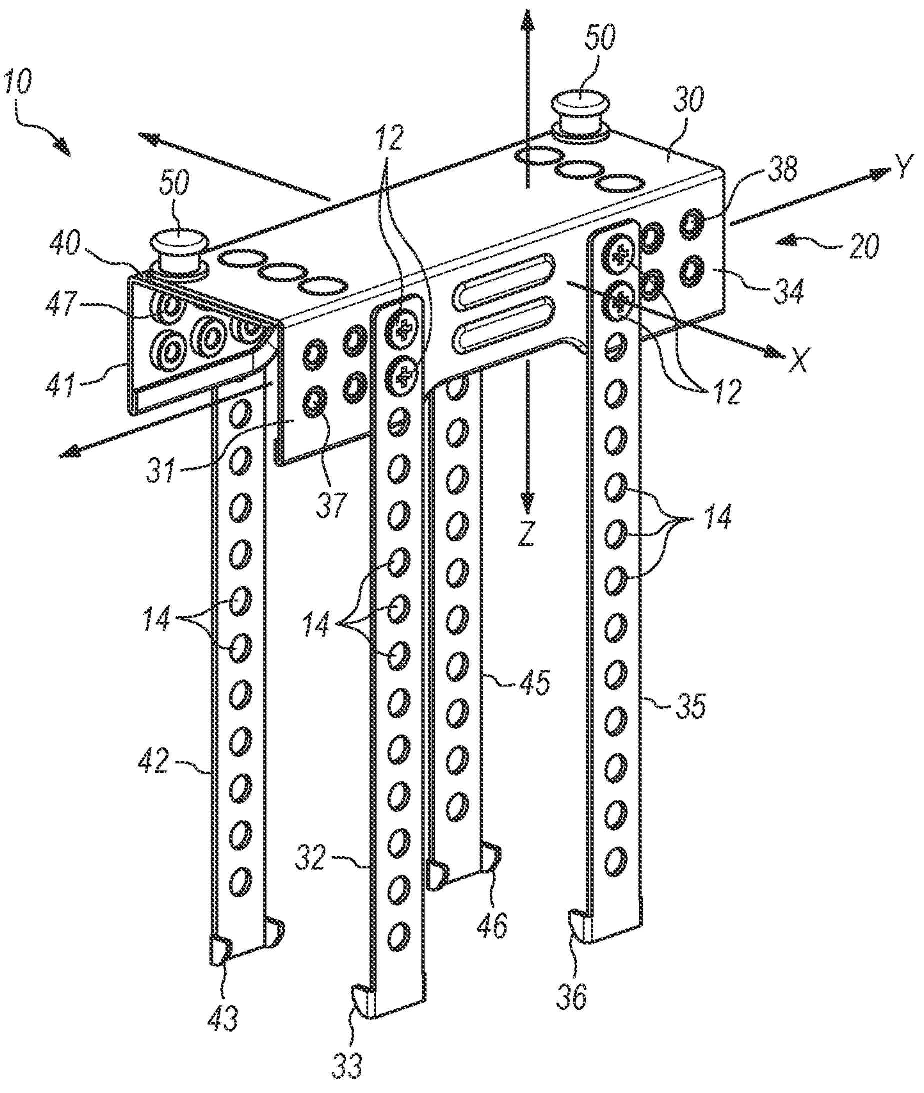
FIGS. 1A-B are diagrams of a tool for disconnecting a graphics processing unit.

Some embodiments provide an apparatus comprising a tool body including first and second overlapping body members, wherein the first and second body members are joined together by a first linear slide establishing a first coordinate axis, wherein the first body member has a first planar region that is perpendicular to the first coordinate axis and faces away from the second body member, and wherein the second body member has a second planar region that is perpendicular to the first coordinate axis and faces away from the first body member. The apparatus further comprises a latch secured to the first body member and selectively engageable with the second body member to prevent relative movement of the first and second body members along the first coordinate axis. Still further, the apparatus comprises first and second elongate arms that are planar and have a distal end forming a hook, wherein the first and second elongate arms are selectively securable to the first and second planar regions at a plurality of positions along a lengthwise axis of the first and second elongate arms, and wherein the hook formed on the distal end of the first elongate arm is directed inwardly toward the hook formed on the distal end of the second elongate arm.

Embodiments of the tool may be used to enable removal of a graphics processing unit (GPU) and removal of a GPU bridge card, such as an NVlink bridge, in a densely populated GPU system, like SR670 v2 and SR675 v3, without prying or breaking of the GPU, GPU bridge card or adjacent components. The tool may have a mechanical width adjustment (x direction), a mechanical lateral adjustment (y direction), and a mechanical depth adjustment (z direction) for positioning the hooks for engagement with a lower edge of a device that is to be removed. For a graphics processing unit, the tool enables two or four hooks to enable lifting the GPU and/or two hooks to enable lifting of a GPU bridge card.

In some embodiments, the two to four vertical depth-adjusting elongate arms may self-engage with the device (i.e., GPU or GPU bridge card). For example, the distance separating opposing elongate arms may be roughly equal to a width of the device, such that the hooks may cause the elongate arms to flex slightly as the hooks slide along a side the device and then the hooks may snap into position under a lower edge of the device as soon as the hooks reach past the side of the device. Alternatively or optionally, a user may flex the tool body by apply a flexing force to the opposing sides of the first and second body members to push the hooks into an engaged position. Such flexing is not required but may be helpful. In the case of the bridge card removal, it may be helpful to apply a flexing force due to ensure engagement between the hook and the bridge due to the shorter length of the elongate arm. In the case of a GPU, a flexing force is felt to be unnecessary when lifting the GPU with the long hook since the gap between GPUs is very narrow.

In some embodiments, each elongate arm may include a plurality of holes aligned along the lengthwise axis. One or more of the plurality of holes may be aligned with one or more holes in the first or second planar regions. The elongate arm may be positionable at several different points on along the lengthwise axis to lengthen or shorten a distance between the tool body and the hooks at the distal end of the elongate arm. The apparatus preferably also includes a plurality of fasteners for securing the elongate arm in a selected position. For each elongate arm to be selectively secured to one of the first and second planar regions, at least one fastener may be securable in one of the holes in the elongate arm and one of the holes in the planar region. Optionally, the plurality of fasteners may be screws. For example, the plurality of holes in each elongate arm may be round and the one or more holes in the first and second planar regions may be threaded holes to securely engage threads of the screws.

In some embodiments, the first body member may have a third planar region that is perpendicular to the first coordinate axis, faces away from the second body member, and is coplanar with the first planar region. Similarly, the second body member may have a fourth planar region that is perpendicular to the first coordinate axis, faces away from the first body member, and is coplanar with the second planar region. The third and fourth planar regions facilitate use of third and fourth elongate arms in the same or similar manner that the first and second planar regions facilitate the use of the first and second elongate arms. Specifically, the apparatus may include third and fourth elongate arms that are planar and have a distal end forming a hook. The third and fourth elongate arms may be selectively securable to the third and fourth planar regions at a plurality of positions along a lengthwise axis of the third and fourth elongate arms, and wherein the hook formed on the distal end of the third elongate arm is directed inwardly toward the hook formed on the distal end of the fourth elongate arm.

In some embodiments, the first and second planar regions each include a plurality of laterally spaced sets of holes. The first elongate arm may be selectively securable to any one of the laterally spaced sets of holes in the first planar region to adjust a lateral position of the first elongate arm, which may establish a distance between the first elongate arm and the third elongate arm. Similarly, the second elongate arm may be selectively securable to any one of the laterally spaced sets of holes in the second planar region to adjust a lateral position of the second elongate arm, which may establish a distance between the second elongate arm and the fourth elongate arm. Each of the laterally spaced sets of holes may still support upward or downward vertical adjustment of the elongate arms along the length of the elongate arms.

In some embodiments, wherein the third and fourth planar regions each include a plurality of laterally spaced sets of holes. The third elongate arm may be selectively securable to any one of the laterally spaced sets of holes in the third planar region to adjust a lateral position of the third elongate arm, which may establish a distance between the third elongate arm and the first elongate arm. Similarly, the fourth elongate arm may be selectively securable to any one of the laterally spaced sets of holes in the fourth planar region to adjust a lateral position of the fourth elongate arm, which may establish a distance between the fourth elongate arm and the second elongate arm. Again, each of the laterally spaced sets of holes may still support upward or downward vertical adjustment of the elongate arms along the length of the elongate arms.

In some embodiments, the latch that is secured to the first body member is a first spring-loaded plunger latch having a first plunger directed at the second body member. In cooperation with the first spring-loaded plunger latch, the second body member may include a first plurality of latch holes having axial centers that are arranged linearly forming a first line parallel to the first linear slide, where the first spring-loaded plunger latch and the first plurality of latch holes are equidistant from the first linear slide. Accordingly, the first plunger is receivable into any of the first plurality of latch holes so that the width of the tool body may be easily adjusted and then secured by allowing the plunger to extend into a selected one of the latch holes.

In some embodiments, the first body member secures a second spring-loaded plunger latch having a second plunger directed at the second body member and laterally spaced from the first spring-loaded plunger latch. In cooperation with the second spring-loaded plunger latch, the second body member may include a second plurality of latch holes having axial centers that are arranged linearly forming a second line parallel to the first linear slide, where the second spring-loaded plunger latch and the second plurality of latch holes are equidistant from the first linear slide. Accordingly, the second plunger is receivable into any of the second plurality of latch holes so that the width of the tool body may be easily adjusted and then secured by allowing the plunger to extend into a selected one of the latch holes. The first and second spring-loaded plunger latches should both be retracted from a respective latch hole in order to enable the first and second body members to move along the linear slide and adjust the width of the tool body. Once the tool body has reached the desired width or position, the first and second spring-loaded plunger latches may be released so that the respective plungers are able to extend into a respective latch hole.

In some embodiments, the first linear slide includes a linear slot in the second body member and a retaining slider received within the linear slot for preventing non-linear movement between the first and second body members. Optionally, the linear slot may have an open end for enabling separation of the first body member from the second body member with the latch disengaged from the second body member. Furthermore, the linear slot and the retaining slider may be provided by the opposite body member to achieve the first linear slide. The first linear slide may also be provided by other linear slide configurations.

In some embodiments, wherein the first and second body members are further joined together by a second linear slide that is parallel to the first linear slide and laterally spaced apart from the first linear slide. The second linear slide may include a second linear slot in the second body member and a second retaining slider received within the second linear slot for preventing non-linear movement between the first and second body members. Optionally, the second linear slot may have an open end for enabling separation of the first body member from the second body member with the latch disengaged from the second body member. Furthermore, the second linear slot and the second retaining slider may be provided by the opposite body member to achieve the second linear slide. The second linear slide may also be provided by other linear slide configurations.

In some embodiments, the first body member includes a first angle plate, and the second body member includes a second angle plate. For example, each body member may be a metal plate that has been bent to form a right-angle (90 degree) bend. Accordingly, the angle plate may be referred to as an L-plate. For each angle plate, one side may include components or features related to the linear slide and the latch, whereas the other side may include the planar regions with holes or other features for attachment of the elongate arms.

In some embodiments, the first and second body members may each have a textured surface that faces away from the textured surface of the other body member to facilitate gripping of the tool body. The textured surface is preferably laterally centered between the planar regions where the elongate arms are secured. As a non-limiting example, a user's thumb may be positioned against a first textured surface of the first body member and one or more of the user's fingers on the same hand as the thumb may be positioned against a second textured surface of the second body member. Accordingly, the tool body is easy to hold and, if desired, to flex slightly.

In some embodiments, the first elongate arm is extendable into a gap between first and second graphics processing units, the second elongate arm is extendable into a gap between the first and a third graphics processing units, and the first and second elongate arms define a rectangular area above the hooks and between the two arms for receiving and lifting the first graphics processing unit out from between the second and third graphics processing units.

In some embodiments, the first and second elongate arms are extendable into a gap between first and second graphics processing units, and the hooks of the first and second elongate arms are extendable below a GPU bridge that connects the first and second graphics processing units for receiving and lifting the GPU bridge until the GPU bridge is disconnected from the first and second graphics processing units. The elongate arms used for lifting and disconnecting a GPU bridge may be different than the elongate arms used for lifting and disconnecting a graphics processing unit (GPU).

Some embodiments provide a kit comprising the previously described apparatus having first and second elongate arms, and further comprising an additional two (i.e., third and fourth) elongate arms each having a distal end that forms a hook. The additional two (i.e., third and fourth) elongate arms may be interchangeable with the first and second elongate arms and selectively securable to the first and second planar regions. The hook formed on the distal end of one of the additional (i.e., the third) elongate arm may be directed inwardly toward the hook formed on the distal end of the other additional (i.e., fourth) elongate arm, and wherein the hooks formed on the additional (i.e., third and fourth) elongate arms have a different size and/or shape than the hooks formed on the first and second elongate arms. Optionally, the additional elongate arms may have a 90-degree twist such that an upper end of the elongate arms are perpendicular to the first coordinate axis for fastening to the planar regions and the distal ends of the elongate arms that form the hooks are parallel to the first coordinate axis of the linear slide. In a further option, the third and fourth elongate arms may be secured to the planar regions at a plurality of positions along a lengthwise axis of the additional two (i.e., third and fourth) elongate arms The first and second elongate arms may define a rectangular area above the hooks for receiving and lifting a graphics processing unit, and the third and fourth elongate arms may define a rectangular area above the hooks for receiving and lifting a GPU bridge connecting two adjacent graphics processing units.

In some embodiments of the kit, the first elongate arm is extendable into a gap between first and second graphics processing units, the second elongate arm is extendable into a gap between the first and a third graphics processing units, and the first and second elongate arms define a rectangular area above the hooks for receiving and lifting the first graphics processing unit out from between the second and third graphics processing units. By contrast, the third and fourth elongate arms are extendable into a gap between the first and second graphics processing units so that the hooks of the third and fourth elongate arms are positionable below a bridge that connects the first and second graphics processing units for lifting receiving and lifting the bridge until the bridge is disconnected from the first and second graphics processing units.

In some embodiments of the kit, the first body member may have a third planar region that is perpendicular to the first coordinate axis, faces away from the second body member, and is coplanar with the first planar region. Similarly, the second body member may have a fourth planar region that is perpendicular to the first coordinate axis, faces away from the first body member, and is coplanar with the second planar region. The apparatus may further include fifth and sixth elongate arms that are planar and have a distal end forming a hook, wherein the fifth and sixth elongate arms are selectively securable to the third and fourth planar regions at a plurality of positions along a lengthwise axis of the fifth and sixth elongate arms. The hook formed on the distal end of the fifth elongate arm may be directed inwardly toward the hook formed on the distal end of the sixth elongate arm.

In some embodiments of the kit, the first and second planar regions may each include a plurality of laterally spaced sets of holes. The first elongate arm may be selectively securable to any one of the laterally spaced sets of holes in the first planar region to adjust a lateral distance between the first elongate arm and the fifth elongate arm, and the second elongate arm may be selectively securable to any one of the laterally spaced sets of holes in the second planar region to adjust a lateral distance between the second elongate arm and the sixth elongate arm.

The foregoing kits embodiments may further include any of the features of the other apparatus embodiments described herein, and the apparatus embodiments may further include any of the features of the kit embodiments described herein.

Figure 1B:
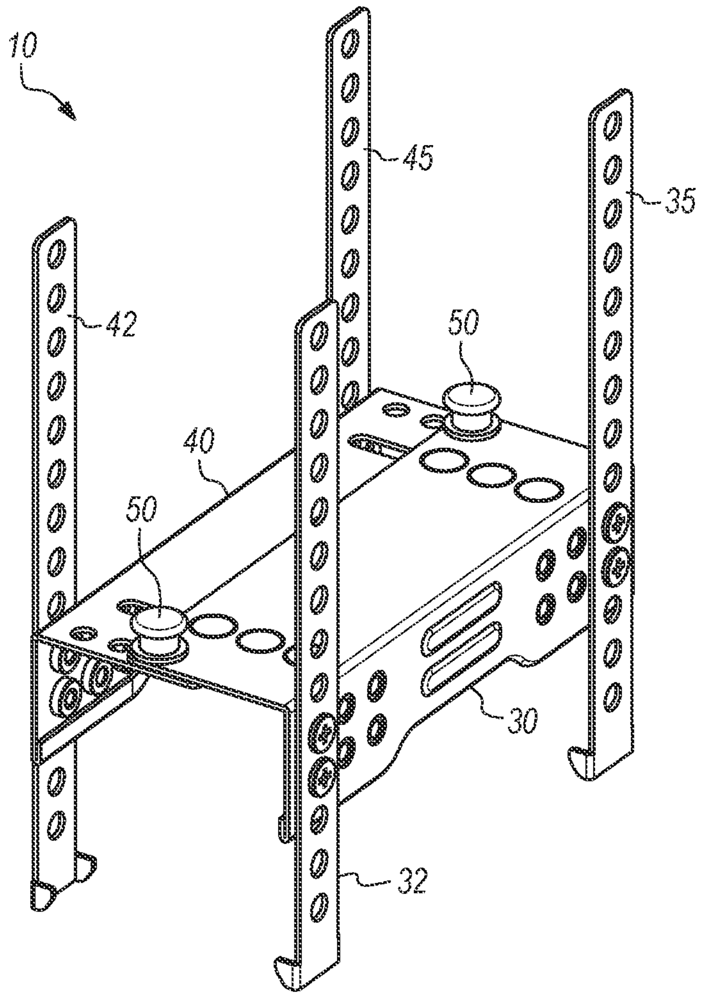

FIGS. 1A-C are perspective views of a tool or apparatus 10 for disconnecting a graphics processing unit (GPU) from a slot in which the GPU has been installed. In reference to FIG. 1A, the tool 10 is shown having a tool body 20 including a first body member 30 and a second body member 40. A portion of the first and second body members 30, 40 overlap each other. The first and second body members 30, 40 are joined together by a first linear slide (shown in FIGS. 2A-2B) establishing a first coordinate axis X (see also coordinate axis Y and Z).

The first body member 30 has a first planar region 31 that is perpendicular to the first coordinate axis X and faces away from the second body member 40. Similarly, the second body member 40 has a second planar region 41 that is perpendicular to the first coordinate axis X and faces away from the first body member 30. The tool 10 further includes a latch 50 secured to the first body member 30 and selectively engageable with the second body member 40 to prevent relative movement of the first and second body members 30, 40 along the first coordinate axis X so that the first and second planar regions 31, 41 have a fixed distance of separation. Still further, the tool 10 includes first and second elongate arms 32, 42 that are planar and have distal ends forming hooks 33, 43.

The first and second elongate arms 32, 42 are selectively securable to the first and second planar regions 31, 42 at a plurality of positions along a lengthwise axis (in the Z axis direction) of the first and second elongate arms 32, 42. Also, note that the hook 33 formed on the distal end of the first elongate arm 32 is directed inwardly toward the hook 43 formed on the distal end of the second elongate arm 42.

The first body member 30 has a third planar region 34 that is perpendicular to the first coordinate axis X and faces away from the second body member 40. Similarly, the second body member 40 has a fourth planar region 43 (not shown; see FIG. 2B) that is perpendicular to the first coordinate axis X and faces away from the first body member 30. As shown, the first and third planar regions 31, 34 are coplanar, and the second and fourth planar regions 41, 43 (not shown; see FIG. 2B) are coplanar. The tool 10 may further include third and fourth elongate arms 35, 45 that are planar and have a distal end forming a hook 36, 46. The third and fourth elongate arms 35, 45 are selectively securable to the third and fourth planar regions 41, 43 at a plurality of positions along a lengthwise axis (in the Z axis direction of the first and second elongate arms 35, 45. Also, note that the hook 36 formed on the distal end of the third elongate arm 35 is directed inwardly toward the hook 46 formed on the distal end of the fourth elongate arm 45.

FIG. 1B is a perspective view of the tool 10 with the elongate arms 32, 42, 35, 45 adjusted upward or vertically (in the Z direction) relative to the position of the same elongate arms shown in FIG. 1A. This change in position might be implemented in order for the tool 10 to be used to receive and lift an electronic component having a shorter height (in the Z direction).

In the illustrated embodiment of the tool 10, each elongate arm includes a plurality of holes 14 aligned along the lengthwise axis (in the Z direction), where one or more of the plurality of holes 14 may be aligned with the one or more holes 37, 47 in the first or second planar regions 31, 41. A plurality of fasteners 12 are provided so that each elongate arm may be selectively secured to one of the first and second planar regions 31, 41 by securing at least one fastener in one of the holes 14 in the elongate arm and one of the holes 37, 47 in the planar region. As shown here, the plurality of fasteners 12 are screws, the plurality of holes 14 in each elongate arm are round, and the one or more holes 37, 47 in the first and second planar regions are threaded holes to securely engage threads of the screws. Still further, the threaded holes may include weld nuts or similar attachments secured to the planar regions to provide the holes with threads.

In order to change the vertical position or effective length of the elongate arms 32, 42, 35, 45, a user would remove the pair of screws 12 securing each of the elongate arms 32, 42, 35, 45 (the screws securing the elongate arms 42, 45 are not shown), raise the elongate arms to align selected holes in the arms with the threaded holes 37, 38, 47, 48 (see also FIG. 2B) in the planar regions 31, 41, 34, 44, then thread the screws 12 into the threaded holes to secure the elongate arms in place.

As shown in FIG. 1B, the elongate arms 32, 42, 35, 45 of the tool 10 have also been repositioned laterally (in the Y direction). Specifically, the first and second planar regions 31, 41 each include a plurality of laterally spaced sets of holes 37, 47 (three sets shown from left to right in the Y direction). The first elongate arm 32 is selectively securable to any one of the laterally spaced sets of holes in the first planar region 31 to adjust a lateral position of the first elongate arm 32. Similarly, the second elongate arm 42 is selectively securable to any one of the laterally spaced sets of holes in the second planar region 41 to adjust a lateral position of the second elongate arm 42.

In embodiments that use additional elongate arms, the third and fourth planar regions 34, 44 may optionally each include a plurality of laterally spaced sets of holes 38, 48 (three sets shown from left to right in the Y direction). Accordingly, the third elongate arm 35 is selectively securable to any one of the laterally spaced sets of holes in the third planar region 34 to adjust a lateral position of the third elongate arm and the fourth elongate arm 45 is selectively securable to any one of the laterally spaced sets of holes in the fourth planar region 44 to adjust a lateral position of the fourth elongate arm.

As previously stated, the elongate arms are in vertically downward position in FIG. 1A and have been adjusted vertically upward (in the Z direction) in FIG. 1B. Notice that the four elongate arms are also laterally closer together in FIG. 1A and laterally further apart from each other in FIG. 1B. Still further, an amount of linear extension of the first body member 30 and the second body member 40 is at a minimum in FIG. 1A and the amount of linear extension has been incrementally increased in FIG. 1B. One embodiment of a linear slide and latch that provide for incremental linear extension is described in reference to FIGS. 2A-B and other Figures to follow.

Figure 2A:
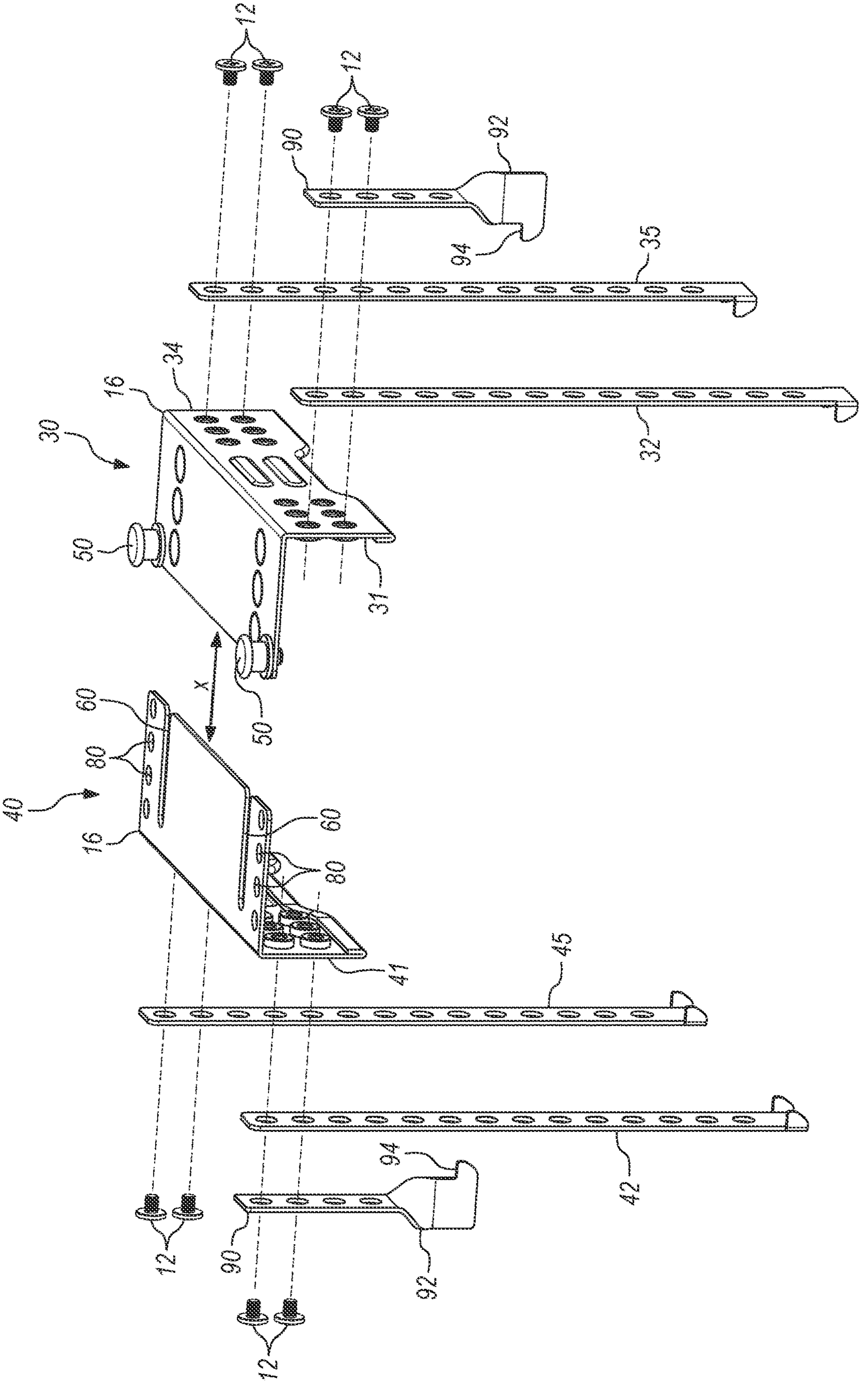
FIGS. 2A-B are top and bottom assembly diagrams of the tool.
Figure 2B:
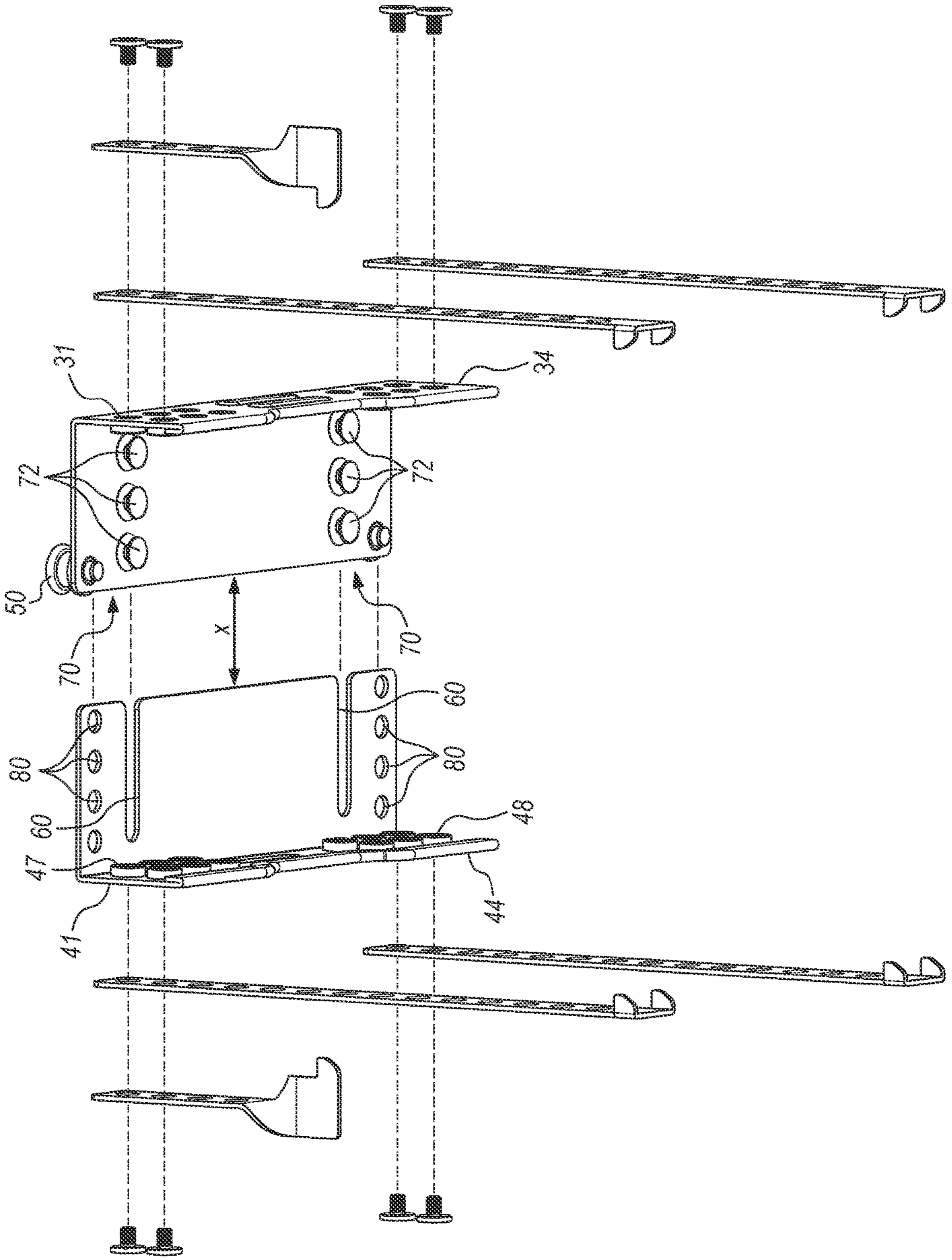

FIGS. 2A-B are top and bottom assembly diagrams of the tool 10. In particular, these Figures show the features of the first body member 30 and the second body member 40 that form a linear slide and latch according to one embodiment. A first linear slide is formed by the combination of a linear slot 60 in the second body member 40 and a retaining slider 70 receivable within the linear slot 60 for preventing non-linear movement between the first and second body members 30, 40. As shown, each retaining slider 70 is made with three T-slider pins 72 arranged in a straight line and aligned with the linear slots 60. The linear slots 60 may have an open end for enabling separation of the first body member 30 from the second body member 40 with the latches 50 disengaged from the second body member 40. However, once the retaining slider 70 is received into the linear slots 60, relative movement between the first and second body members 30, 40 is limited to linear motion in the X direction. Here, the first and second body members 30, 40 are further joined together by a second linear slide of the same construction that is parallel to the first linear slide and laterally spaced apart from the first linear slide.

The latches 50 secured to the first body member 30 (2 latches shown) work in cooperation with a plurality of latch holes 80 in the second body member 40 (5 latch holes shown per latch). The positions of the latches 50 and latch holes 80 are most clearly shown in FIGS. 2A and 2B, but the alignment and operation of the latch with the latch holes is better shown below in reference to FIGS. 3A and 3B.

The first body member 30 includes a first angle plate, and the second body member 40 includes a second angle plate. For example, each body member 30, 40 may be a metal plate that has been bent to form a right-angle (90 degree) bend 16 at a lateral bend line (that extends in the Y direction). Accordingly, the angle plates may be referred to as L-plates. For each angle plate, one (inwardly-directed) side may include components or features related to the linear slide and the latch, whereas the other (downwardly-directed) side may include the planar regions 31, 41, 34, 44 with holes or other features for attachment of the elongate arms.

The assembly diagram illustrates a first option of securing four elongate arms 32, 42, 35, 45 to the respective four planar regions 31, 41, 34, 44 using a pair of screws 12 for each elongate arm. However, a second option allows for securing two elongate arms 90 to two of the opposing planar regions in the same manner. The elongate arms 90 include an upper end with a plurality of holes for securing to the planar regions and a lower end that includes a 90-degree twist below the plurality of holes. The 90-degree twist allows the distal ends 92 of the elongate arms 90 to lie in the same plane as the hooks 94. As a result, the distal ends 92 and hooks 94 may extend into a narrow gap between two adjacent GPU as later shown in FIGS. 8A and 8B. However, the components shown in FIGS. 2A and 2B may be provided as a kit, where the longer of the elongated arms, which are intended for use lifting a GPU, are interchangeable with the shorter of the elongated arms, which are intended for use lifting a GPU bridge.

Figure 3A:
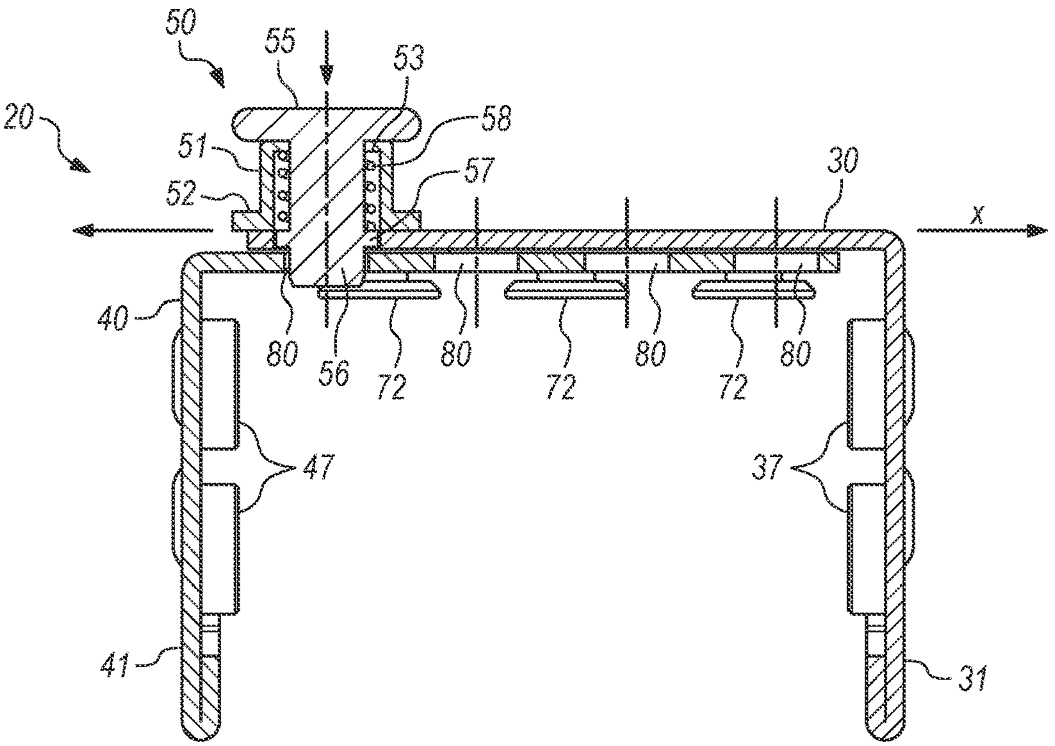
FIGS. 3A-B are cross-sectional views of the tool body illustrating the construction and operation of a plunger for manually adjusting a width dimension of the tool.
Figure 3B:
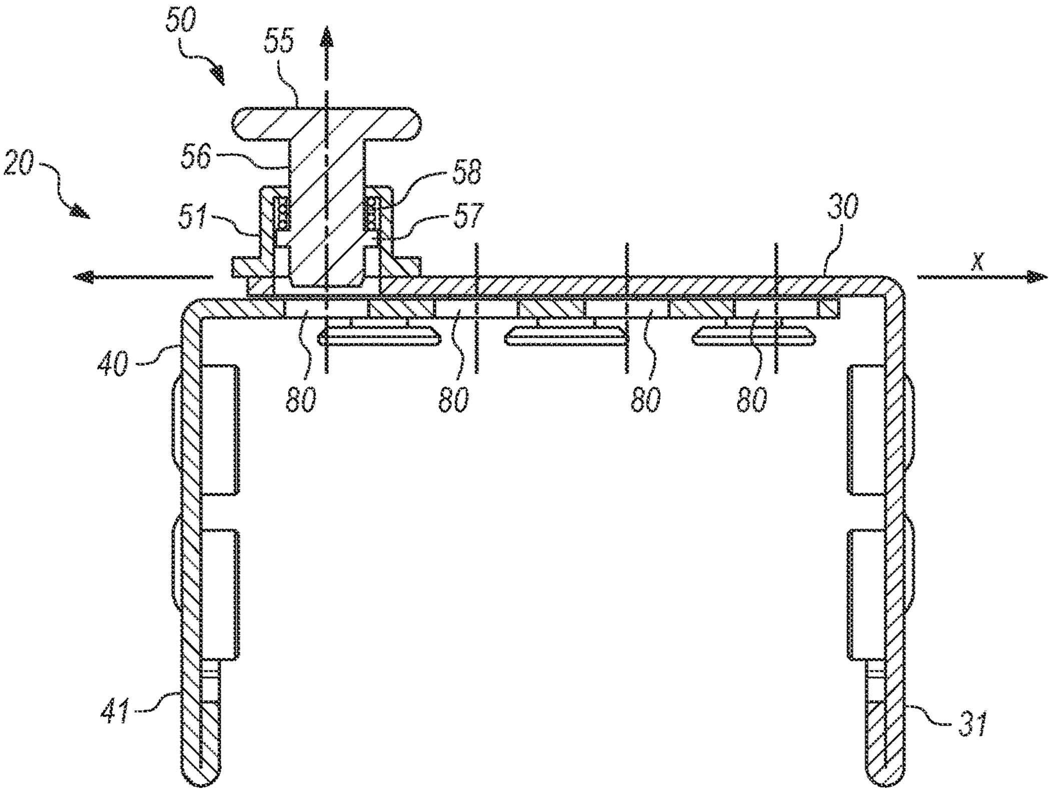

FIGS. 3A-B are cross-sectional views of the tool body 20 illustrating the construction and operation of a spring-loaded plunger latch 50 for manually adjusting a width dimension of the tool body 20. In reference to FIG. 3A, the plunger latch 50 has a stationary sleeve 51 with a flange 52 secured to a top surface of the first body member 30. The stationary sleeve 51 has a top end opposite the flange 52 with a narrow hole that forms a downwardly-directed (first) shoulder 53. The plunger 54 has a head portion 55 and a pin portion 56 that extends from the head portion 55 and is directed at the second body member 40. The pin portion 56 extends through the narrow hole in the top of the stationary sleeve 51, through the stationary sleeve 51, through a narrow hole in the first body member 30 and is selectively extendable into a further latch hole 80 in the second body member 40. The pin portion 56 further from a circumferential rib 57 that slides along the inside surface of the stationary sleeve 51. The circumferential rib 57 may assist in keeping the pin portion 56 in a vertical orientation, but also provides an upwardly-directed (second) shoulder. A constrained area between the outer surface of the pin 56, the upwardly-directed shoulder of the circumferential rib 57, the inner surface of the stationary sleeve 51, and the downwardly-directed shoulder 53 holds a coil spring 58. The coil spring 58 presses upward against the stationary downwardly-directed shoulder 53 to bias the pin portion 56 by pressing downwardly against the upwardly-directed shoulder of the circumferential rib 57.

A distal end of the pin portion 56 may be selectively received into any of the plurality of latch holes 80 in the second body member 40, where the plurality of latch holes 80 have axial centers that are arranged linearly forming a first line parallel to the first linear slide (see also FIG. 2B). Specifically, the first spring-loaded plunger latch 50 and the first plurality of latch holes 80 are equidistant from the first linear slide (see the linear slot 60 and T-slider pins 72 in FIG. 2B) for the first plunger 56 to be receivable into any of the first plurality of latch holes 80.

Embodiments preferably include a second spring-loaded plunger 50 secured to the first body member 30, such as illustrated in FIGS. 1A-2B. The first and second spring-loaded plungers may have identical construction and are preferably spaced apart and adjacent to first and second lateral slides.

In reference to FIG. 3B, a user may manually lift the head portion 55 to cause the pin portion 56 to retract from the latch hole 80. In this position, the first and second body members 30, 40 are able to slide with translational motion along the first coordinate axis (shown here as the X direction) established by the linear slide(s). When the tool body 20 has the desired width (X dimension) as shown by the distance between the first planar region 31 and the second planar region 41, then the head portion 55 may be released so that the coil spring 58 will bias the pin portion 56 toward the second body member 40 and into another of the latch holes 80. Any number of latch holes and any incremental spacing may be implemented.

Figure 4A:
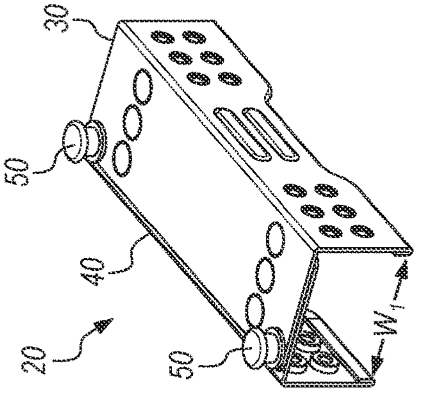
FIGS. 4A-C are top perspective views of the tool body adjusted to three different widths.
Figure 4B:
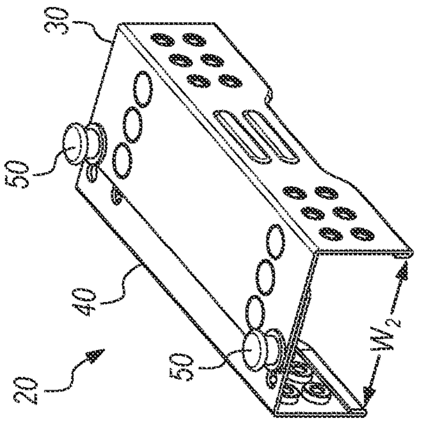
Figure 4C:
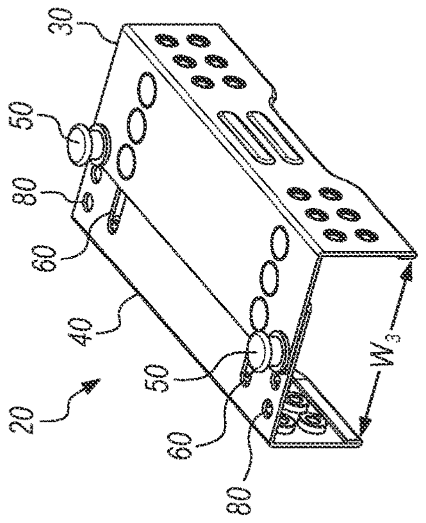
Figure 4D:
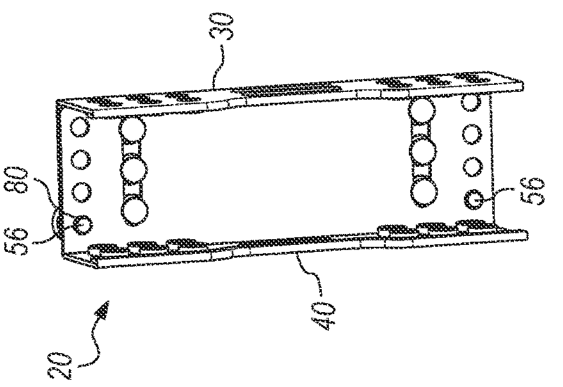
FIGS. 4D-F are bottom perspective views of the tool body adjusted to three different widths corresponding to FIGS. 4A-C, respectively.
Figure 4E:
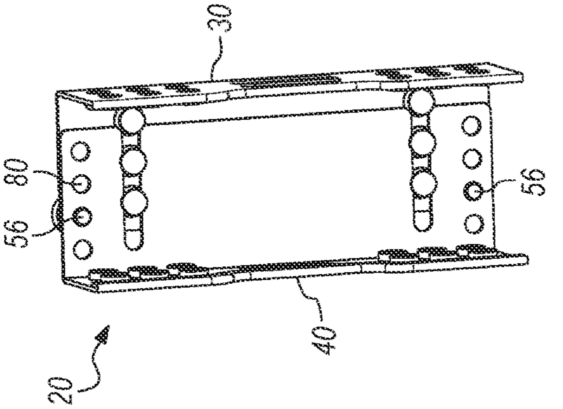
Figure 4F:
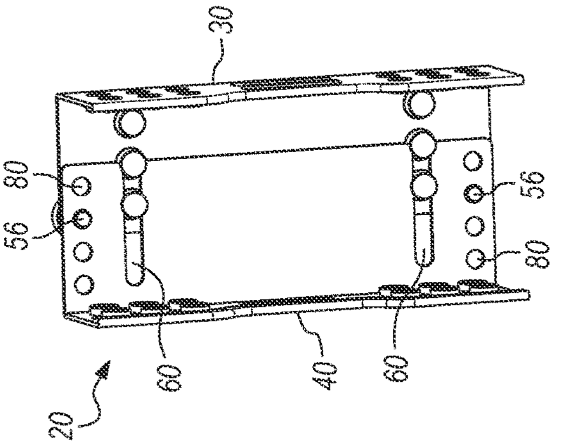

FIGS. 4A-C are top perspective views of the tool body 20 adjusted to three different widths. FIGS. 4D-F are bottom perspective views of the tool body adjusted to the three different widths corresponding to FIGS. 4A-C, respectively.

In FIGS. 4A and 4D, two plunger latches 50 (FIG. 4A) are positioned with their respective pin portions 56 (FIG. 4D) received into respective first latch holes 80 (FIG. 4D). As a result, the tool body 20 is secured with a first (narrowest) width as measured along the first coordinate axis established by the linear slide. As shown in FIGS. 4A-F, the second body member 40 has four latch holes 80 aligned with one plunger latch and another four latch holes 80 aligned with the other plunger latch.

In FIGS. 4B and 4E, the two plunger latches 50 (FIG. 4B) are positioned with their respective pin portions 56 (FIG. 4E) received into respective second latch holes 80 (FIG. 4E). As a result, the tool body 20 is secured with a second width as measured along the first coordinate axis established by the linear slide.

In FIGS. 4C and 4F, the two plunger latches 50 (FIG. 4C) are positioned with their respective pin portions 56 (FIG. 4F) received into respective third latch holes 80 (FIG. 4F). As a result, the tool body 20 is secured with a third width as measured along the first coordinate axis established by the linear slide.

Figure 5:
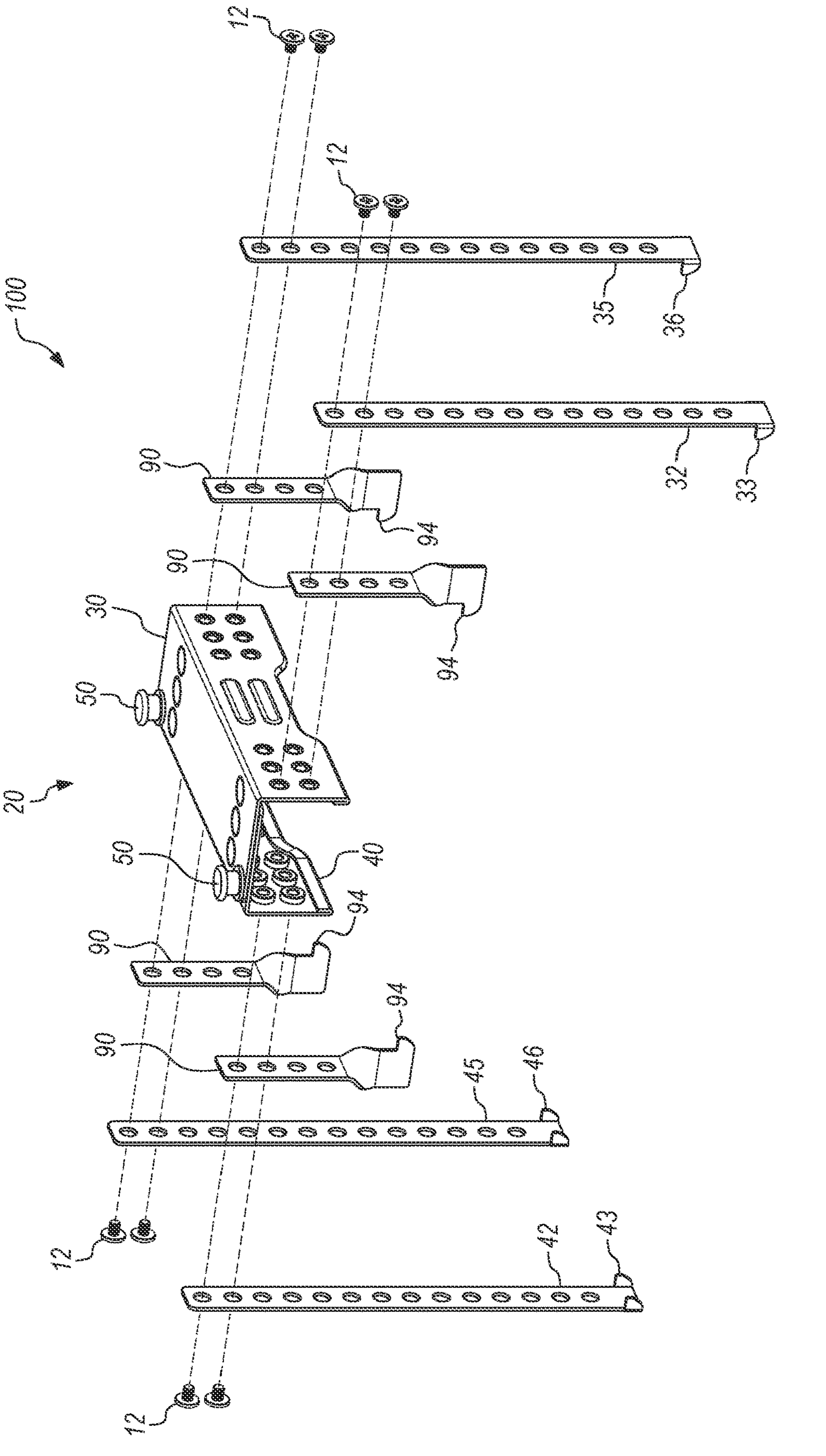
FIG. 5 is an assembly diagram of the tool illustrating the multiple types of arms may be attached to the tool body.

FIG. 5 is an assembly diagram of the tool 10 illustrating the multiple types of elongate arms or arms may be attached to the tool body 20. In particular, FIG. 5 illustrates a kit 100 comprising the previously described tool 10 (see FIG. 1A) having four of a first configuration of elongate arms 32, 42, 35, 45 and four of a second configuration of elongate arms 90, where each elongate arm has a distal end that forms a hook. The second configuration of elongate arms 90 are interchangeable with the first configuration of elongate arms 32, 42, 35, 45 and selectively securable to the planar regions at a plurality of positions along a lengthwise axis of the elongate arms. The hooks formed on the distal end of the elongate arms are directed inwardly toward a hook on an opposing elongate arm. As shown, the hooks 94 formed on the second configuration of elongate arms 90 have a different size and/or shape than the hooks 33, 43, 36, 46 formed on the first configuration of the elongate arms 32, 42, 35, 45. The second configuration of elongate arms may be interchanged with the first configuration of elongate arms using the screws in the same manner as previously described for adjusting the vertical position of an elongate arm and/or adjusting the lateral position of an elongate arm.

Figure 6A:
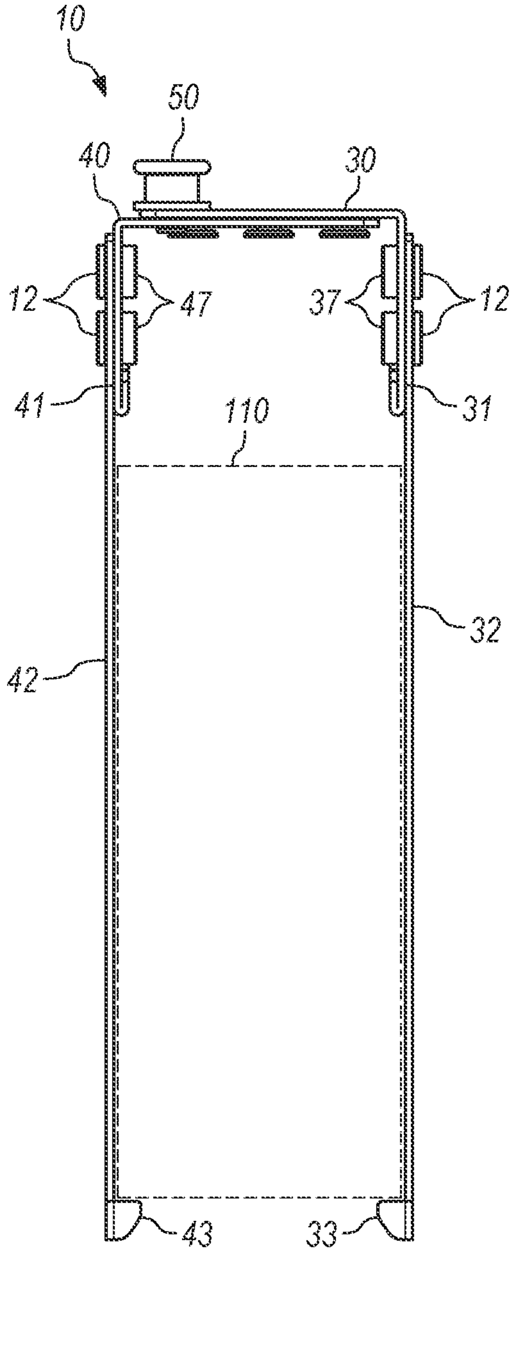
FIGS. 6A-B are end views of the tool with long arms and short arms, respectively.
Figure 6B:
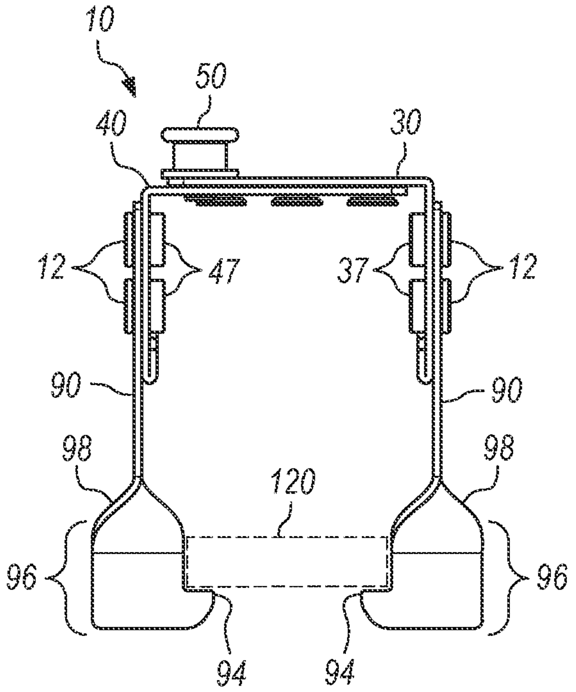

FIGS. 6A-B are end views of the tool 10 with a first configuration of elongate arms or arms 32, 42 (FIG. 6A) and a second configuration of elongate arms or arms 90 (FIG. 6B), respectively. In FIG. 6A, the tool 10 has the first configuration of elongate arms or arms 32, 42 secured to the first and second planar regions 31, 41 of the body members 30, 40 using the screws 12 threadably secured to the threaded holes 37, 47, respectively. In the configuration of FIG. 6A, the elongate arms or arms 32, 42 and their hooks 33, 43 form an area 110 (shown in dashed lines) for receiving a graphics processing unit (GPU) that is to be lifted out of a slot.

In FIG. 6B, the tool 10 has the second configuration of elongate arms or arms 90 secured to the first and second planar regions 31, 41 of the body members 30, 40 using the screws 12 threadably secured to the threaded holes 37, 47, respectively. In the configuration of FIG. 6B, the elongate arms or arms 90 and their hooks 94 form an area 120 (shown in dashed lines) for receiving a GPU bridge that is to be lifted and disconnected from two adjacent GPUs. The second configuration of elongate arms or arms 90 has an upper portion that is planar with a plurality of holes for being secured to the first and second planar regions 31, 41. A lower portion of the second configuration of elongate arms or arms 90 is also planar, but perpendicular to the upper portion. The lower portion 96 may be connected to the upper portion by a twisted section 98. The importance of the lower portions 96 (below the twisted sections 98) lying in a common plane will explained further in reference to FIGS. 8A-B.

Figure 7A:
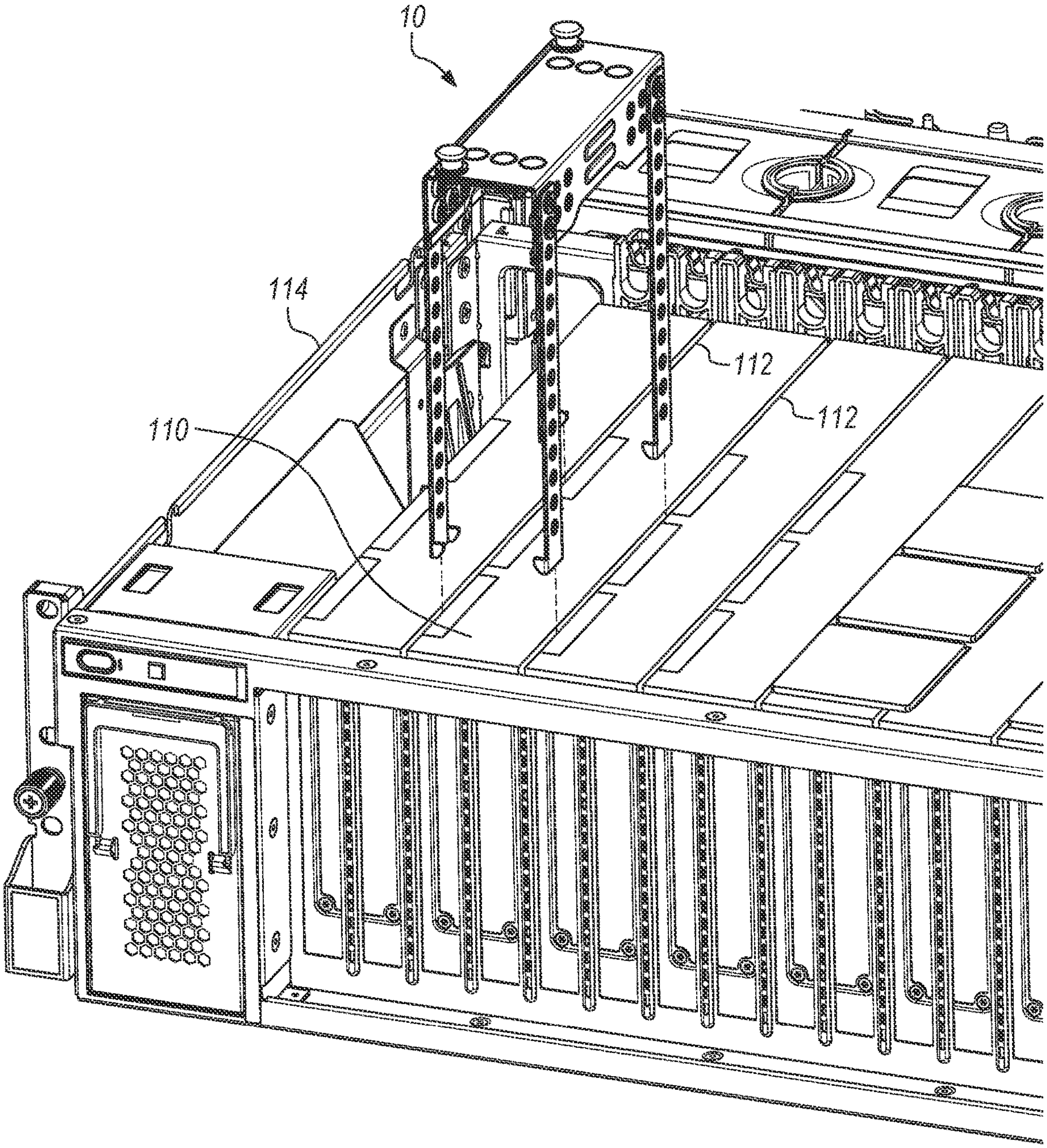
FIGS. 7A-B are perspective views of the tool with longs arms aligned over a graphics processing unit (GPU) and inserted between adjacent graphics processing units, respectively.
Figure 7B:
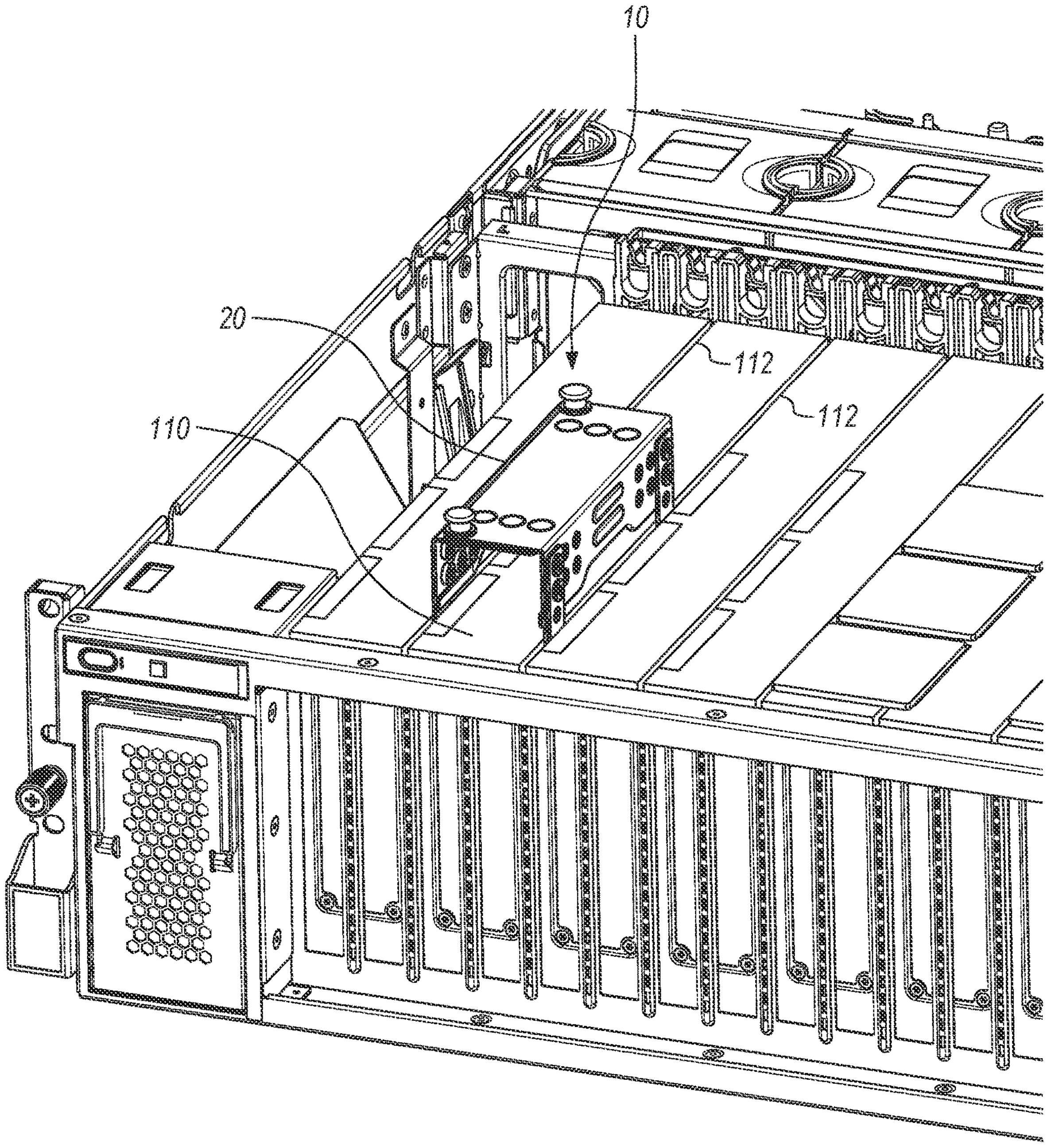

FIGS. 7A-B are perspective views of the tool 10 configuration as in FIG. 1A. In FIG. 7A, the tool 10 is aligned over a graphics processing unit (GPU) 110 so that the elongate arms may be inserted downward into the gaps 112 on opposing sides of the GPU 110. The gaps 112 are very narrow because of the adjacent graphics processing units. Accordingly, the elongate arms must be accurately aligned with the gaps and the plane of the elongate arms must be parallel to the plane of the gaps (i.e., the plane of the side of the GPU 110) so that the elongate arms may pass through the gaps 112.

In FIG. 7B, elongate arms have been fully extended into the gaps 112 along the GPU 110, such that the hooks (not shown) will swing into place underneath a lower edge of the GPU 110 as illustrated in FIG. 6A. Accordingly, the user may then grip the tool body 20 and lift the tool 10 upward until the GPU has been disconnected from a slot where it was installed. The GPU may be completely removed from the chassis 114 using only the tool 10, or the user may grab the GPU with a free hand once the GPU has been lifted out from between adjacent GPUs or other components a sufficient distance so as to be easily handled.

Figure 7C:
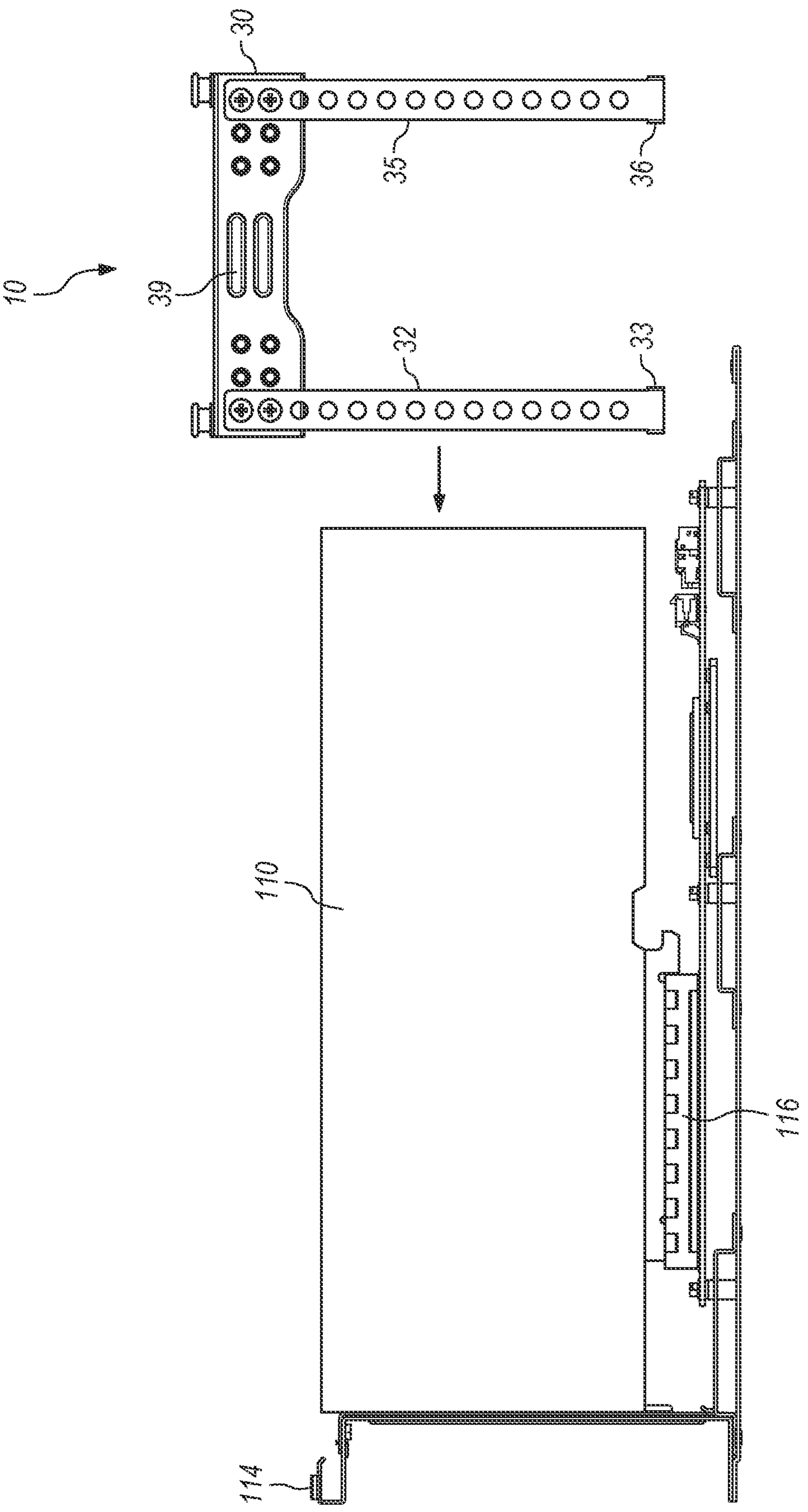
FIGS. 7C-D are side views of the tool with longs arms aligned with an end of a graphics processing unit (GPU) and positioned along a side of the graphics processing units, respectively.
Figure 7D:
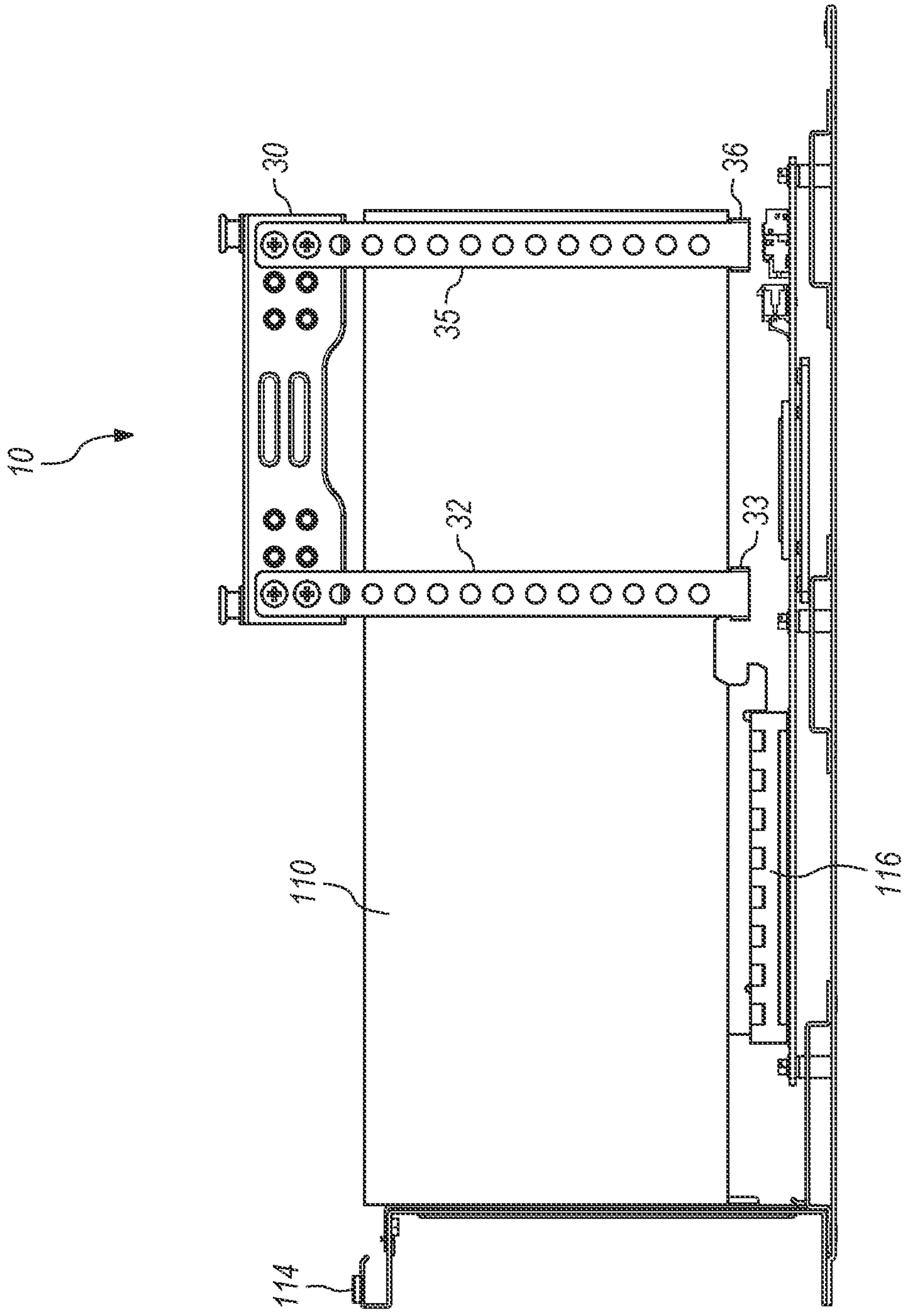

FIGS. 7C-D are side views of the tool 10 as in FIGS. 7A-B but illustrating an alternative manner of positioning the elongate arms and hooks beneath the GPU 110. In FIG. 7C, the elongate arms 32, 35 are aligned with an end of the GPU 110, assuming such access is available. With the hooks 33, 36 slightly below the lower edge of the GPU, the tool 10 is moved sideways (to the left in the illustration) so that the elongate arms pass closely along the side of the GPU. This view highlights the location of a textured surface 39 that improves a user's grip on the tool.

In FIG. 7D, the tool 10 is in position to begin lifting the GPU upward to disconnect the GPU 110 from the slot 116. Note that there are two additional elongate arms (not shown; see FIG. 1A) that are similarly position along the opposing side of the GPU with their own hooks positioned under the lower edge of the GPU. With the hooks providing points of contact on each side of the GPU, the GPU should be lifted straight upward to avoid damage that could otherwise occur due to prying or uneven lifting.

Figure 8A:
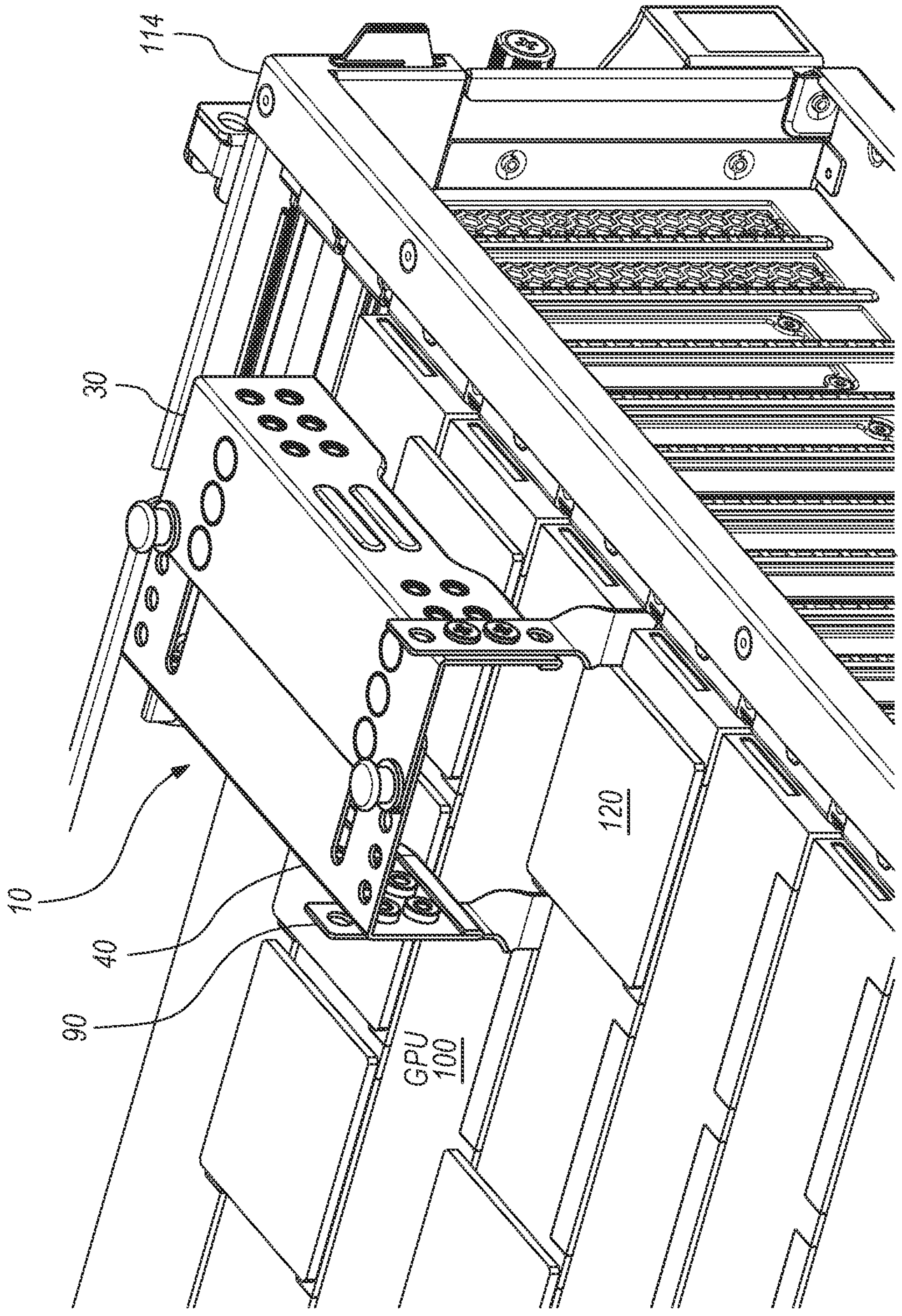
FIGS. 8A-B are perspective and cross-sectional views of the tool having a pair of short arms at one end of the tool body that are positioned for lifting a GPU bridge.
Figure 8B:
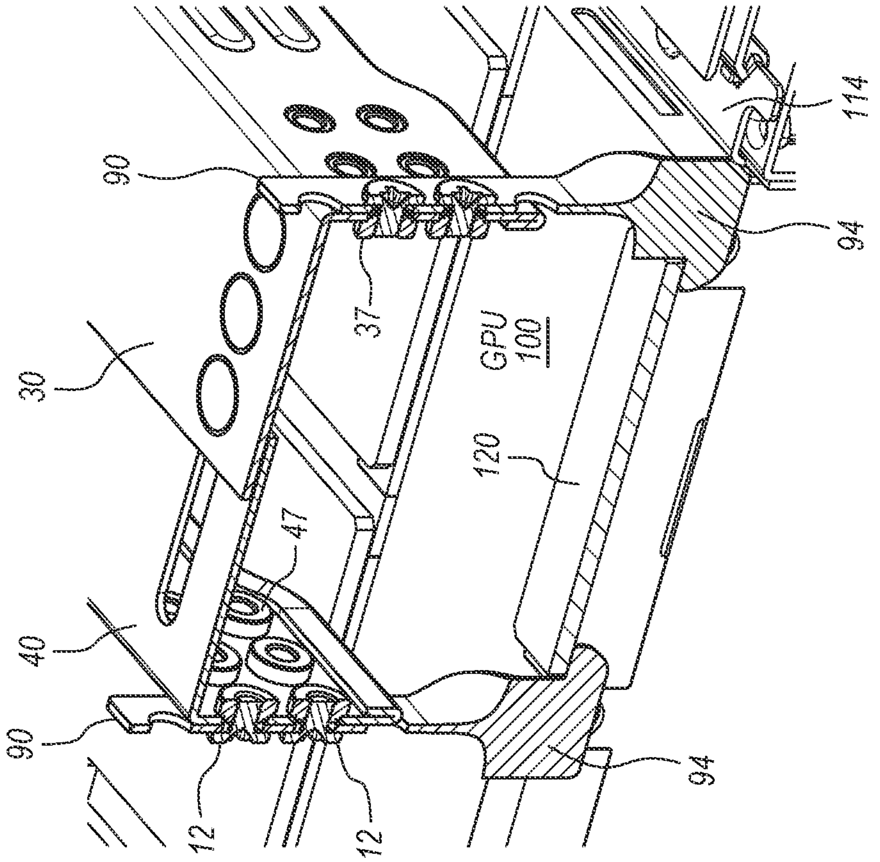

FIGS. 8A-B are perspective and cross-sectional views of the tool 10 having a pair of the second configuration of elongate arms or arms 90 at one end of the tool body. A GPU bridge 120 extends across a narrow gap between the two GPUs to which the GPU bridge is connected. The tool 10 has been positioned for lifting the GPU bridge 120 by inserting the lower portions 96 of the two elongate arms 90 into the gap. With the hooks 94 positioned underneath the lower edge of the GPU bridge 120, the tool 10 may be lifted to disconnect the GPU bridge. Optionally, the tool body may be flexed by the user's grip in order to assistant the hooks 94 extending under the GPU bridge. As previously discussed in reference to FIG. 6B, the lower portion of the elongate arms 90 lie in a single, common plane that allows them to fit into the single narrow gap between two GPUs with their hooks directed inwardly toward each other.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. An apparatus, comprising:

a tool body including first and second overlapping body members, wherein the first and second body members are joined together by a first linear slide establishing a first coordinate axis, wherein the first body member has a first planar region that is perpendicular to the first coordinate axis and faces away from the second body member, and wherein the second body member has a second planar region that is perpendicular to the first coordinate axis and faces away from the first body member;

a latch secured to the first body member and selectively engageable with the second body member to prevent relative movement of the first and second body members along the first coordinate axis; and first and second elongate arms that are planar and have a distal end forming a hook, wherein the first and second elongate arms are selectively securable to the first and second planar regions at a plurality of positions along a lengthwise axis of the first and second elongate arms, and wherein the hook formed on the distal end of the first elongate arm is directed inwardly toward the hook formed on the distal end of the second elongate arm.

2. The apparatus of claim 1, wherein each elongate arm includes a plurality of holes aligned along the lengthwise axis, and wherein one or more of the plurality of holes may be aligned with one or more holes in the first or second planar regions, the apparatus further comprising:

a plurality of fasteners, wherein, for each elongate arm to be selectively secured to one of the first and second planar regions, at least one fastener is securable in one of the holes in the elongate arm and one of the holes in the planar region.

3. The apparatus of claim 2, wherein the plurality of fasteners are screws, the plurality of holes in each elongate arm are round, and the one or more holes in the first and second planar regions are threaded holes to securely engage threads of the screws.

4. The apparatus of claim 1, wherein the first body member has a third planar region that is perpendicular to the first coordinate axis and faces away from the second body member, and wherein the second body member has a fourth planar region that is perpendicular to the first coordinate axis and faces away from the first body member, wherein the first and third planar regions are coplanar, and wherein the second and fourth planar regions are coplanar, the apparatus further comprising:

third and fourth elongate arms that are planar and have a distal end forming a hook, wherein the third and fourth elongate arms are selectively securable to the third and fourth planar regions at a plurality of positions along a lengthwise axis of the third and fourth elongate arms, and wherein the hook formed on the distal end of the third elongate arm is directed inwardly toward the hook formed on the distal end of the fourth elongate arm.

5. The apparatus of claim 4, wherein the first and second planar regions each include a plurality of laterally spaced sets of holes, wherein the first elongate arm is selectively securable to any one of the laterally spaced sets of holes in the first planar region to adjust a lateral distance between the first elongate arm and the third elongate arm, and wherein the second elongate arm is selectively securable to any one of the laterally spaced sets of holes in the second planar region to adjust a lateral distance between the second elongate arm and the fourth elongate arm.

6. The apparatus of claim 5, wherein the third and fourth planar regions each include a plurality of laterally spaced sets of holes, wherein the third elongate arm is selectively securable to any one of the laterally spaced sets of holes in the third planar region to adjust a lateral distance between the third elongate arm and the first elongate arm, and wherein the fourth elongate arm is selectively securable to any one of the laterally spaced sets of holes in the fourth planar region to adjust a lateral distance between the fourth elongate arm and the second elongate arm.

7. The apparatus of claim 1, wherein the latch secured to the first body member is a first spring-loaded plunger latch having a first plunger directed at the second body member, wherein the second body member includes a first plurality of latch holes having axial centers that are arranged linearly forming a first line parallel to the first linear slide, and wherein the first spring-loaded plunger latch and the first plurality of latch holes are equidistant from the first linear slide for the first plunger to be receivable into any of the first plurality of latch holes.

8. The apparatus of claim 7, wherein the first body member secures a second spring-loaded plunger latch having a second plunger directed at the second body member and laterally spaced from the first spring-loaded plunger latch, wherein the second body member includes a second plurality of latch holes having axial centers that are arranged linearly forming a second line parallel to the first linear slide, and wherein the second spring-loaded plunger latch and the second plurality of latch holes are equidistant from the first linear slide for the second plunger to be receivable into any of the second plurality of latch holes.

9. The apparatus of claim 1, wherein the first linear slide includes a linear slot in the second body member and a retaining slider received within the linear slot for preventing non-linear movement between the first and second body members.

10. The apparatus of claim 9, wherein the linear slot has an open end for enabling separation of the first body member from the second body member with the latch disengaged from the second body member.

11. The apparatus of claim 1, wherein the first and second body members are further joined together by a second linear slide that is parallel to the first linear slide and laterally spaced apart from the first linear slide.

12. The apparatus of claim 1, wherein the first body member includes a first angle plate, and wherein the second body member includes a second angle plate.

13. The apparatus of claim 1, wherein the first and second body members each have a textured surface that faces away from the textured surface of the other body member to facilitate gripping of the tool body.

14. The apparatus of claim 1, wherein the first elongate arm is extendable into a gap between first and second graphics processing units, the second elongate arm is extendable into a gap between the first and a third graphics processing units, and the first and second elongate arms define a rectangular area above the hooks for receiving and lifting the first graphics processing unit out from between the second and third graphics processing units.

15. The apparatus of claim 1, wherein the first and second elongate arms are extendable into a gap between first and second graphics processing units, and wherein the hooks of the first and second elongate arms are extendable below a bridge that connects the first and second graphics processing units for receiving and lifting the bridge until the bridge is disconnected from the first and second graphics processing units.

16. A kit, comprising:

the apparatus of claim 1; and third and fourth elongate arms each having a distal end that forms a hook, wherein the third and fourth elongate arms are interchangeable with the first and second elongate arms and selectively securable to the first and second planar regions, wherein the hook formed on the distal end of the third elongate arm is directed inwardly toward the hook formed on the distal end of the fourth elongate arm, and wherein the hooks formed on the third and fourth elongate arms have a different size, shape, or size and shape than the hooks formed on the first and second elongate arms.

17. The kit of claim 16, wherein the first and second elongate arms define a rectangular area above the hooks for receiving and lifting a graphics processing unit, and wherein the third and fourth elongate arms define a rectangular area above the hooks for receiving and lifting a bridge connecting two adjacent graphics processing units.

18. The kit of claim 16, wherein the first elongate arm is extendable into a gap between first and second graphics processing units, the second elongate arm is extendable into a gap between the first and a third graphics processing units, and the first and second elongate arms define a rectangular area above the hooks for receiving and lifting the first graphics processing unit out from between the second and third graphics processing units;

wherein the third and fourth elongate arms are extendable into a gap between the first and second graphics processing units, and wherein the hooks of the third and fourth elongate arms are extendable below a bridge that connects the first and second graphics processing units for receiving and lifting the bridge until the bridge is disconnected from the first and second graphics processing units.

19. The kit of claim 16, wherein the first body member has a third planar region that is perpendicular to the first coordinate axis and faces away from the second body member, and wherein the second body member has a fourth planar region that is perpendicular to the first coordinate axis and faces away from the first body member, wherein the first and third planar regions are coplanar, and wherein the second and fourth planar regions are coplanar, the apparatus further comprising:

fifth and sixth elongate arms that are planar and have a distal end forming a hook, wherein the fifth and sixth elongate arms are selectively securable to the third and fourth planar regions at a plurality of positions along a lengthwise axis of the fifth and sixth elongate arms, and wherein the hook formed on the distal end of the fifth elongate arm is directed inwardly toward the hook formed on the distal end of the sixth elongate arm.

20. The kit of claim 19, wherein the first and second planar regions each include a plurality of laterally spaced sets of holes, wherein the first elongate arm is selectively securable to any one of the laterally spaced sets of holes in the first planar region to adjust a lateral distance between the first elongate arm and the fifth elongate arm, and wherein the second elongate arm is selectively securable to any one of the laterally spaced sets of holes in the second planar region to adjust a lateral distance between the second elongate arm and the sixth elongate arm.

* * * * *